(12) United States Patent
Nashizawa

(10) Patent No.: US 10,992,854 B2
(45) Date of Patent: Apr. 27, 2021

(54) IMAGE PROCESSING APPARATUS, IMAGING APPARATUS, IMAGE PROCESSING METHOD, AND STORAGE MEDIUM

(71) Applicant: CANON KABUSHIKI KAISHA, Tokyo (JP)

(72) Inventor: Hiroaki Nashizawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 16/173,061

(22) Filed: Oct. 29, 2018

(65) Prior Publication Data
US 2019/0132528 A1    May 2, 2019

(30) Foreign Application Priority Data

Nov. 2, 2017 (JP) .............................. JP2017-212316

(51) Int. Cl.
| | |
|---|---|
| H04N 5/232 | (2006.01) |
| H04N 5/235 | (2006.01) |
| H04N 5/357 | (2011.01) |
| H04N 9/04 | (2006.01) |
| G06T 7/13 | (2017.01) |
| G06T 7/32 | (2017.01) |
| G06T 5/50 | (2006.01) |
| G02B 27/00 | (2006.01) |

(52) U.S. Cl.
CPC ..... *H04N 5/232133* (2018.08); *G02B 27/005* (2013.01); *G06T 7/13* (2017.01); *H04N 5/232* (2013.01); *H04N 5/232122* (2018.08); *H04N 5/232127* (2018.08); *H04N 5/3572* (2013.01); *H04N 9/04519* (2018.08)

(58) Field of Classification Search
CPC ....... H04N 5/232133; H04N 5/232127; H04N 5/232122; H04N 5/3572; H04N 5/2356; H04N 9/04519; G06T 5/003; G06T 5/50; G06T 7/13; G06T 7/223; G06T 7/32; G02V 27/005; G02B 27/005
USPC ....... 348/345, 349, 207.99, 241, 239, 222.1, 348/208.12, 326, 218.1, 240.99, 240.1, 348/63, 211.9, 240.2, 347, 223.1; 382/255, 266, 275, 263, 264, 148; 396/79, 80, 82, 89, 121
See application file for complete search history.

(56) References Cited

U.S. PATENT DOCUMENTS

| | | | | |
|---|---|---|---|---|
| 9,077,842 B2 * | 7/2015 | Natsume | ................ | H04N 5/225 348/336 |
| 9,723,203 B1 * | 8/2017 | Kanumuri | .............. | H04N 5/235 348/222.1 |
| 10,375,292 B2 * | 8/2019 | Park | ................... | H04N 5/23212 348/49 |

(Continued)

FOREIGN PATENT DOCUMENTS

| | | | |
|---|---|---|---|
| JP | 5528139 B2 | 6/2014 | |
| JP | 5889010 B2 | 3/2016 | |

*Primary Examiner* — Marly S Camargo
(74) *Attorney, Agent, or Firm* — Cowan, Liebowitz & Latman, P.C.

(57) ABSTRACT

An image processing method includes correcting a magnification in a plurality of images captured at a plurality of different focus positions, aligning the plurality of images having the corrected magnification, correcting a color blur in the plurality of aligned images, and combining the plurality of images having the corrected color blur.

18 Claims, 11 Drawing Sheets

(56) References Cited

U.S. PATENT DOCUMENTS

| | | | | |
|---|---|---|---|---|
| 10,542,204 B2* | 1/2020 | Pettersson | | H04N 5/2356 |
| | | | | 715/771 |
| 2006/0024043 A1* | 2/2006 | Kumagai | | H04N 5/76 |
| | | | | 348/231.2 |
| 2008/0259176 A1* | 10/2008 | Tamaru | | H04N 5/225 |
| | | | | 348/222.1 |
| 2009/0310885 A1* | 12/2009 | Tamaru | | G06K 9/40 |
| | | | | 382/275 |
| 2011/0037877 A1* | 2/2011 | Taamaru | | H04N 5/262 |
| | | | | 348/239 |
| 2011/0141229 A1* | 6/2011 | Stee | | H04N 5/225 |
| | | | | 348/37 |
| 2011/0187887 A1* | 8/2011 | Inoue | | G06K 9/36 |
| | | | | 348/222.1 |
| 2011/0267531 A1* | 11/2011 | Imai | | H04N 5/262 |
| | | | | 348/239 |
| 2013/0194485 A1* | 8/2013 | Maruyama | | H04N 9/7908 |
| | | | | 348/222.1 |
| 2014/0049666 A1* | 2/2014 | Tsutami | | H04N 5/2621 |
| | | | | 348/239 |
| 2014/0354781 A1* | 12/2014 | Matsuyama | | H04N 5/23212 |
| | | | | 348/345 |
| 2015/0062384 A1* | 3/2015 | Tanaka | | H04N 5/262 |
| | | | | 348/222.1 |
| 2015/0130986 A1* | 5/2015 | Ohnishi | | H04N 5/232 |
| | | | | 348/349 |
| 2016/0112630 A1* | 4/2016 | Kanumuri | | H04N 5/23222 |
| | | | | 348/222.1 |
| 2016/0191784 A1* | 6/2016 | Murayama | | H04N 5/23212 |
| | | | | 348/347 |

* cited by examiner

|   |   |   |
|---|---|---|
| 0 | 0 | 1 |
| 0 | 1 | 1 |
| 0 | 1 | 1 |

FIG. 14

IMAGE PROCESSING APPARATUS, IMAGING APPARATUS, IMAGE PROCESSING METHOD, AND STORAGE MEDIUM

BACKGROUND OF THE INVENTION

Field of the Invention

The present invention relates to an image capturing apparatus capable of all (or full) focused image capturing.

Description of the Related Art

One known imaging apparatus performs all focused imaging through focus bracket imaging. The chromatic aberration of an imaging optical system as a color imaging system generates originally absent colors as a color blur around bright portion in an image. A visible color imaging system generates a color blur at a portion distant from the green as a center wavelength of the imaging optical system, and the color blur is an artifact blur in blue or red or purple as a mixture of them, which is referred to as a longitudinal (or axial) chromatic aberration causing an image quality to deteriorate. Due to the longitudinal chromatic aberration in the depth of focus, the near point and the far point are more blurred, spatially wider, and more conspicuous than the object plane. When the longitudinal chromatic aberration remaining in a combined, all focused image, high and low longitudinal chromatic aberrations alternately repeat, red and blue longitudinal chromatic aberrations to alternately repeat, and other phenomena. It is thus necessary to previously correct the longitudinal chromatic aberration, but it is difficult to distinguish the longitudinal chromatic aberration and object color from each other.

Japanese Patent No. ("JP") 5,528,139 discloses a method for calculating a saturation (chroma) or hue difference between two images captured by shifting focus positions, for correcting the longitudinal chromatic aberration when the saturation difference or hue difference is not 0, and for stopping correcting the longitudinal chromatic aberration when the saturation difference or hue difference is 0 because of the object color. JP 5,889,010 discloses a method for moving the focus position, for blurring the longitudinal chromatic aberration, and for making it less conspicuous instead of focusing on the image plane.

However, the method disclosed in JP 5,528,139 does not consider the image magnification variation due to the focus position movement, the position variation due to the hand shake, and a moving object, etc., and the color blur determination accuracy may lower. The method disclosed in JP 5,889,010 can make the longitudinal chromatic aberration less conspicuous but blurs the object, and it is not suitable for a method for an all focused image.

SUMMARY OF THE INVENTION

The present invention provides an image processing apparatus, an imaging apparatus, an image processing method, and a storage medium, which can correct a longitudinal chromatic aberration in an image obtained by all focused imaging.

An image processing method according to one aspect of the present invention includes correcting a magnification in a plurality of images captured at a plurality of different focus positions, aligning the plurality of images having the corrected magnification, correcting a color blur in the plurality of aligned images; and combining the plurality of images having the corrected color blur.

Further features of the present invention will become apparent from the following description of exemplary embodiments with reference to the attached drawings.

BRIEF DESCRIPTION OF THE DRAWINGS

FIG. 14 illustrates a 3×3 pixel area in a longitudinal chromatic aberration map plane according to the second embodiment.

DESCRIPTION OF THE EMBODIMENTS

Referring now to the accompanying drawings, a detailed description will be given of embodiments according to the present invention.

This embodiment discusses a digital camera as one illustrative imaging apparatus, but is not limited to an imaging dedicated apparatus, such as a digital camera. The present invention is applicable to an arbitrary apparatus that has a built-in imaging apparatus or is connected to an imaging apparatus through an external connection, such as a cellular phone, a personal computer (e.g., a laptop type, a desk top type, and a tablet type), a game machine.

Figure 2:
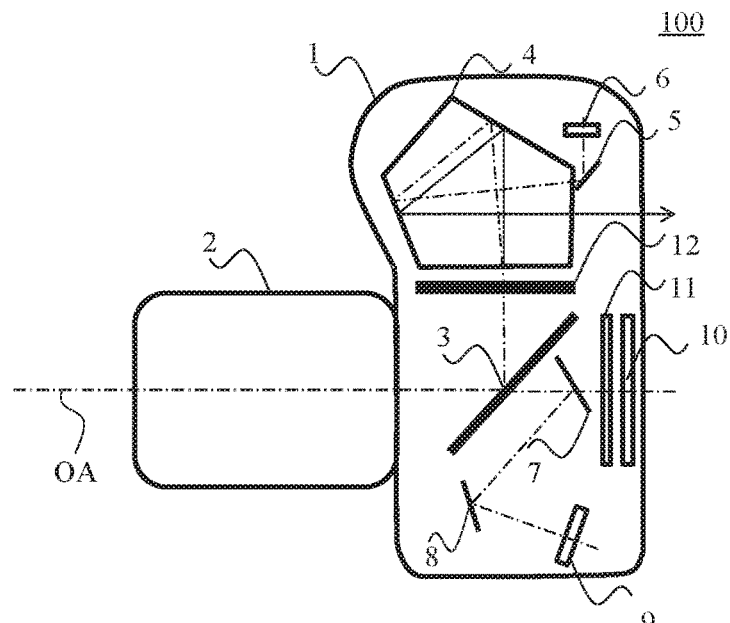
FIG. 2 is a sectional view of the imaging apparatus according to each embodiment.

Referring now to FIG. 2, a description will be given of an imaging apparatus 100 according to this embodiment. FIG. 2 is a sectional view of the image sensor 100, which mainly illustrates an arrangement of optical elements and sensors. The imaging apparatus 100 according to this embodiment is, but not limited to, a digital single-lens reflex camera that includes a camera body 1 (interchangeable lens) and an interchangeable lens (lens apparatus) 2 detachable from the camera body 1. This embodiment is also applicable to an image pickup apparatus in which the camera body 1 and the lens device integrated from each other.

The image capturing apparatus 100 is an image capturing apparatus capable of all focused imaging. In the all focused imaging, the imaging apparatus 100 captures a plurality of images at different in-focus positions in an overall region of an in-focusable object distance, extracts only the in-focus region from each image, combines them into one image, and acquires an image focused on the entire imaging area. At this time, as a change amount of the in-focus position is smaller, an image with a higher resolution can be obtained as a combined, all focused image. However, as the number of image captures increases, and loads of the combining processing speed in the imaging apparatus and the memory and the like increase. This configuration can efficiently change the in-focus position with a necessary minimum change amount. This configuration can combine images so that the range of the depth of field of the images overlap each other.

In the camera body 1, the image sensor 10 is, for example, a CMOS image sensor or a CCD image sensor, including a plurality of pixels (accumulation type photoelectric conversion elements). The interchangeable lens 2 includes an imaging optical system including a movable zoom lens and focus lens along an optical axis OA. The image sensor 10 photoelectrically converts an optical image (object image) formed via the interchangeable lens (imaging optical system) 2 and outputs image data. A mechanical shutter 11 provided near the front side of the image sensor 10 controls the exposure timing and the exposure time of the image sensor 10. A semi-transmission main mirror 3 and a first reflection mirror 7 behind the main mirror 3 moves up to the top in imaging. A second reflection mirror 8 reflects a light flux reflected by the first reflection mirror 7 and causes the reflected light to enter an AF sensor 9 for the focus detection. The AF sensor 9 is, for example, an image sensor having a smaller number of pixels than that of the image sensor 10. The first reflection mirror 7, the second reflection mirror 8, and the AF sensor 9 perform a focus detection by a phase difference detection method at an arbitrary position in the image to be captured.

An AE sensor (photometric sensor) 6 receives the image to be captured reflected by a pentaprism 4 and a third reflection mirror 5. The AE sensor 6 can divide a light receiver into a plurality of areas, and output luminance information of the object for each area. The division number of the light receiver is not limited. The image sensor 10 includes an amplifier circuit of a pixel signal, a peripheral circuit for signal processing, etc., as well as pixels arranged in the light receiver. The image sensor 10 according to this embodiment constitutes at least part of an imager (imaging unit) that acquires a plurality of images captured at a plurality of different focal positions (or a plurality of images captured with discretely shifted focal positions by a predetermined movement amount).

A finder optical system includes the pentaprism 4. Although not illustrated in FIG. 2, the object image reflected by the pentaprism 4 can be observed through the eyepiece. Part of off-axis light among light reflected by a main mirror 3 and diffused by a focus plate 12 enters the AE sensor 6. The interchangeable lens 2 communicates information with the camera body 1 if necessary through a lens mount contact provided on the camera body 1. In the live-view display and motion image recording, the main mirror 3 always moves up. Thus, the exposure control and focus control are performed with the image information of the imaging surface.

Figure 3:
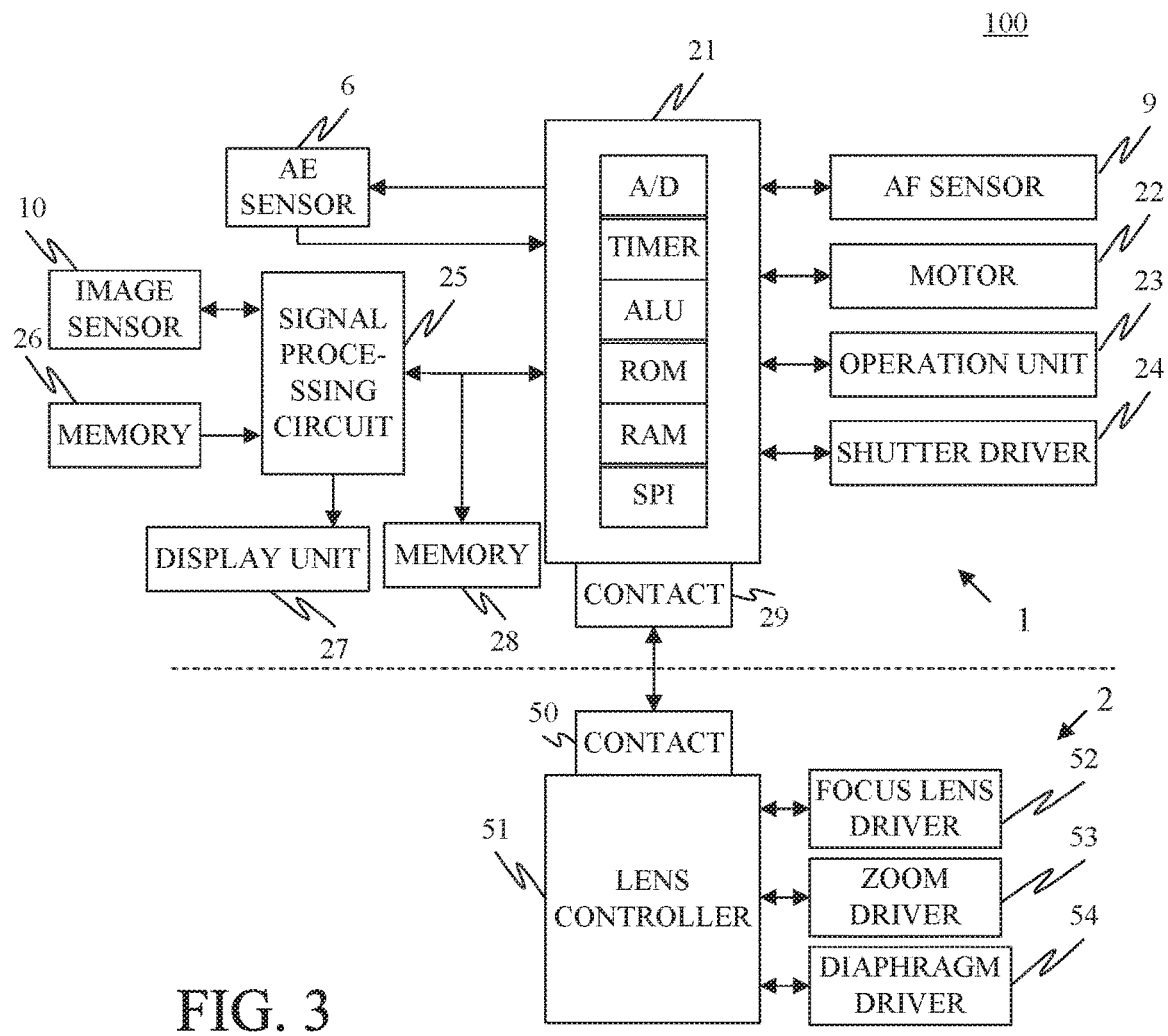
FIG. 3 is a block diagram of the imaging apparatus according to each embodiment.

Referring now to FIG. 3, a description will be given of a configuration of an electric circuit of the imaging apparatus 100 including the camera main body 1 and the interchangeable lens 2. FIG. 3 is a block diagram of the imaging apparatus 100.

In the camera main body 1, a controller 21 includes, for example, an ALU (Arithmetic and Logic Unit), a ROM, a RAM, an A/D converter, a timer, a serial peripheral interface (serial communication port) (SPI), and the like. The controller 21 controls operations of the camera body 1 and the interchangeable lens 2, for example, by executing a program stored in the ROM. A specific operation of the controller 21 will be described later.

Output signals of the AF sensor 9 and the AE sensor 6 are input to the A/D converter input terminal of the controller 21. The signal processing circuit 25 controls the image sensor 10 in accordance with instructions of the controller 21, applies an A/D conversion and various signal processing to the output signal from the image sensor 10 and obtains an image signal. The signal processing circuit 25 performs necessary image processing, such as a compression and a combination, in recording the obtained image signal. A memory 28 is a DRAM or the like, used as a work memory when the signal processing circuit 25 performs various signal processing, or used as a VRAM in displaying an image on a display device 27 described later. The display device 27 includes a liquid crystal display panel or the like, and displays information such as set values and messages of the image sensor 100, menu screens, and the like and captured images. The display device 27 is controlled by the instruction from the controller 21. The memory 26 is a nonvolatile memory such as a flash memory, and receives a captured image signal from the signal processing circuit 25.

A motor 22 moves up and down the main mirror 3 and the first reflection mirror 7, and charges the mechanical shutter 11 in accordance with the instructions of the controller 21. The operation member 23 includes input devices such as switches used by the user to operate the image sensor 100. The operation member 23 includes a release switch for instructing the imaging preparation start and imaging start, an imaging mode selection switch for selecting an imaging mode, a direction key, a determination key or the like. A contact (portion) 29 is used to communicate with the interchangeable lens 2, and connected to the PSI of the controller 21. The shutter driver 24 is connected to the output terminal of the controller 21, and drives the mechanical shutter 11.

The interchangeable lens 2 includes a contact (portion) 50 paired with the contact 29. The contact 50 is connected with a lens controller 51 as a one-chip microcomputer similar to the controller 21, and capable of communicating with the controller 21. The lens controller 51 executes a program, for example, stored in the ROM and controls the operation of the interchangeable lens 2 in accordance with the instruction from the controller 21. The lens controller 51 notifies the controller 21 of information such as a state of the interchangeable lens 2. A focus lens driver 52 is connected to the output terminal of the lens controller 51, and drives the focus lens. The zoom driver 53 changes an angle of view of the interchangeable lens in accordance with the instruction of the lens controller 51. A diaphragm driver 54 adjusts an aperture amount (F-number) of the diaphragm (aperture stop) in accordance with the instruction the lens controller 51.

When the interchangeable lens 2 is attached to the camera body 1, the lens controller 51 and the controller 21 of the camera body 1 can communicate data with each other via the contacts 29 and 50. The electric power is supplied through the contacts 29 and 50 so as to drive the motors and the actuators in the interchangeable lens 2. The lens outputs to the controller 21 of the camera body through the data communication the optical information peculiar to the lens necessary for the controller 21 of the camera body 1 for the focus detection and the exposure calculation, the information on the object distance based on the distance encoder, etc. In addition, the controller 21 of the camera body 1 outputs to the interchangeable lens 2 through the data communication the focusing information and diaphragm information obtained as a result of the focus detection and exposure calculation by the controller 21 of the camera body 1, and the lens controls the diaphragm according to the focusing information.

First Embodiment

Figure 1:
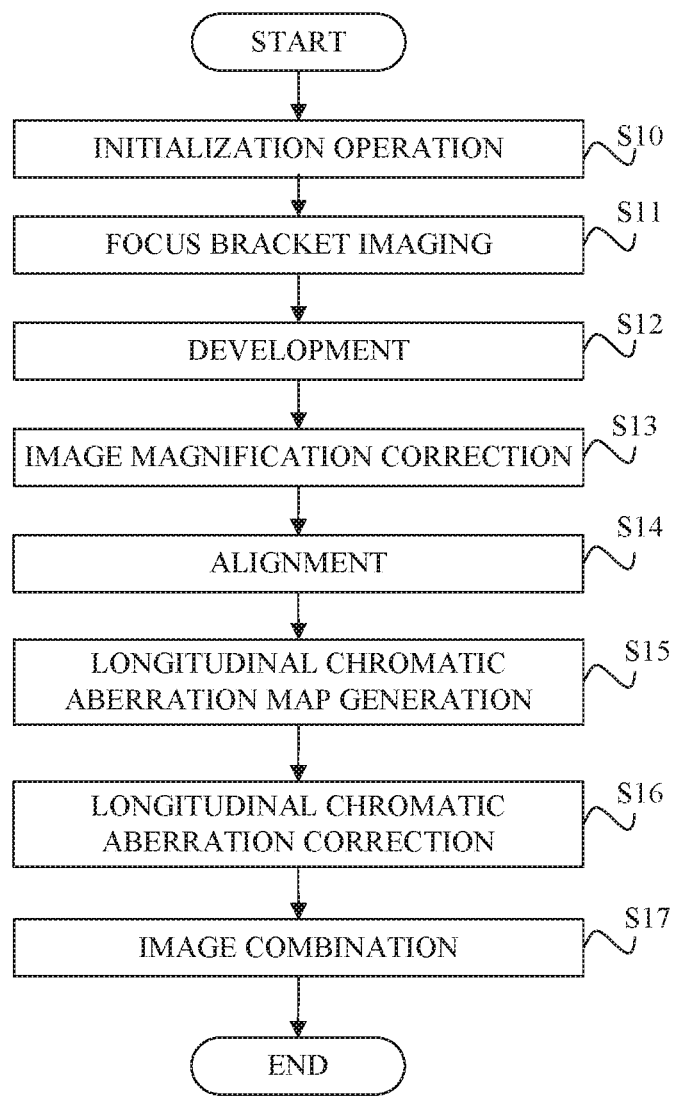
FIG. 1 is a flowchart of an operation of an imaging apparatus according to each embodiment.

Referring now to FIG. 1, a description will be given of an operation (image processing method) of the imaging apparatus 100 according to a first embodiment of the present invention. FIG. 1 is a flowchart of the operation of the imaging apparatus 100. Each step in FIG. 1 is mainly carried out in accordance with the instruction form the controller 21 in the imaging apparatus 100.

When the controller 21 is activated, for example, by turning on the power switch in the operation member 23, the controller 21 executes the processing illustrated in FIG. 1. Initially, in the step S10, the controller 21 communicates with the lens controller 51 in the interchangeable lens 2 and performs initialization processing such as obtaining various types of lens information necessary for the focus detection and photometry. The controller 21 shifts to the all focused imaging mode, and prepares for a dedicated memory arrangement and the CPU control for continuous imaging and image combining. The controller 21 turns on in the middle of operation of the shutter button by a half-pressing operation of the shutter switch in the operation member 23 by the user and starts the AF (autofocus) processing and AE (auto exposure) processing.

Next, in the step S11, the controller 21 provides the focus bracketing imaging while changing the focal position when the user fully presses the shutter switch. It is efficient that a variation amount of the focus position is a minimum necessary change amount. For example, an object distance change def determined by the F-number and the permissible circle of confusion diameter changes the focus position based on the following expression (1). Since a human cannot perceive a change in distance shorter than the object distance change def represented by the expression (1), it is unnecessary to further reduce it.

$$def = \frac{2 \times F_{no} \times \Delta}{\overline{\beta_i} \times \overline{\beta_i}} \quad (1)$$

$\overline{\beta}_i$ is a paraxial magnification at an object distance i.

Figure 4:
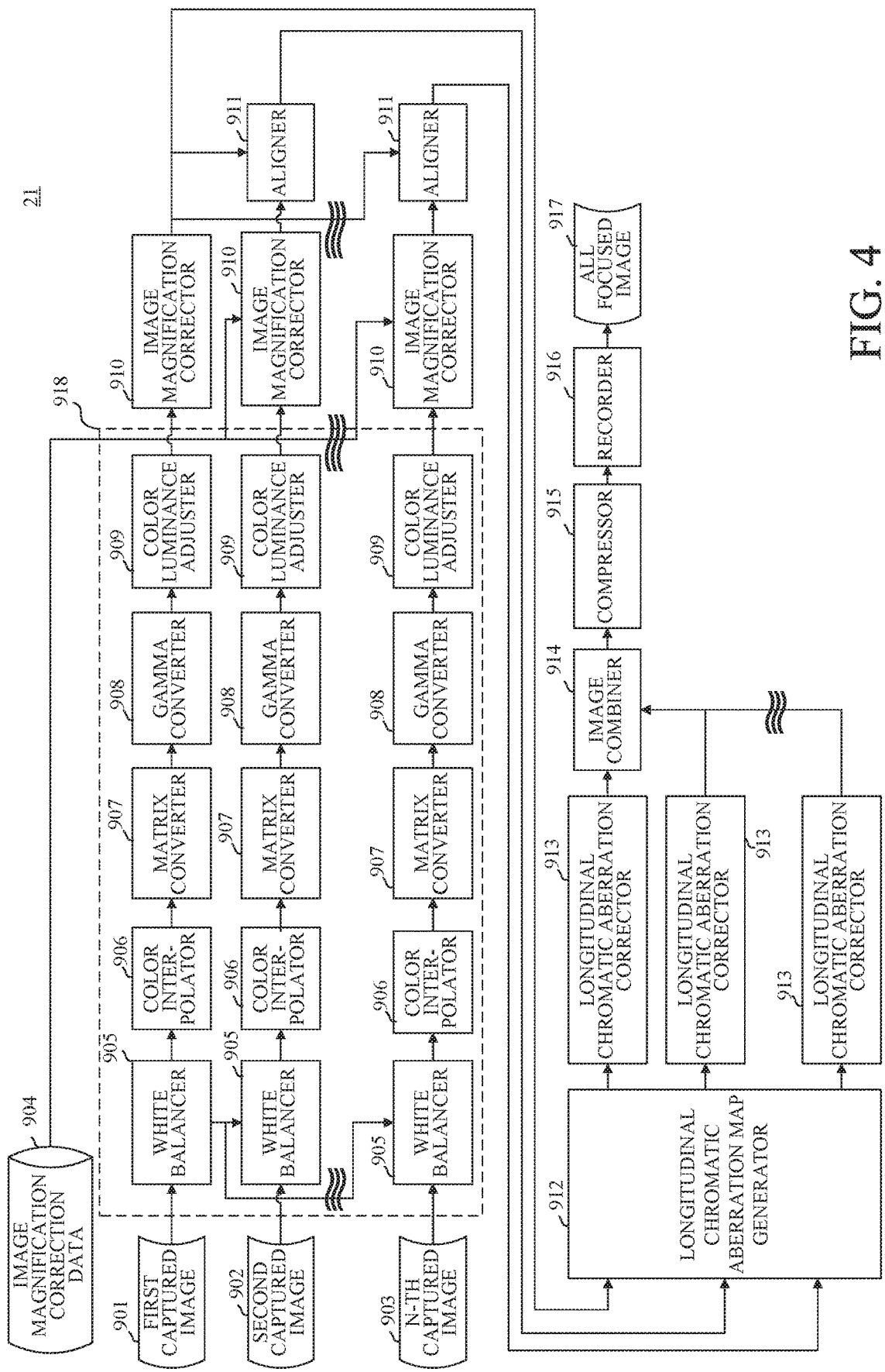
FIG. 4 is a block diagram of a controller according to each embodiment.

Next, in the step S12, the controller 21 develops each of the plurality of images (RAW images) acquired by the focus bracket imaging. Referring now to FIG. 4, a description will be given of the developing processing. FIG. 4 is a block diagram showing the functions of the controller 21 (image processing apparatus). As described above, the controller is a one-chip microcomputer that includes an ALU, a ROM, a RAM, an A/D converter, a timer, an SPI, etc., executes a program stored in the ROM, and carries out the following functions.

An object image formed by the imaging optical system (lens) is formed on the image sensor 10. The image sensor 10 includes, for example, a single plate color image sensor having a general primary color filter. The primary color filter has three types of color filters each having a transmission dominant wavelength band near 650 nm, 550 nm, and 450 nm, which corresponds to the respective bands of R (red), G (green), and B (blue). The single plate color image sensor spatially arranges the color filters for each pixel, and each pixel obtains an intensity in a single color plane. Therefore, captured image data (a first captured image 901, a second captured image 902, and a third captured image 903) as color mosaic images are output from the image sensor 10. A white balancer 905 performs whiting processing. More specifically, the white balancer 905 plots the RGB data of each pixel constituting the captured image data in a predetermined color space, such as an xy color space. Then, the white balancer 905 integrates R, G, and B of the data plotted near the blackbody radiation locus that is likely to be a light source color in the color space, and calculates the white balance coefficients G/R and G/B of the R and B components based on the integrated values. The white balancer 905 performs white balance processing by using the white balance coefficient generated by the above processing.

The color interpolator 906 interpolates the color mosaic image, and generates a color image having color information of R, G, and B in all pixels. The generated color image is converted into a basic color image through a matrix converter 907 and a gamma converter 908. Thereafter, a color luminance adjuster 909 performs processing of improving the appearance of the image for the color image. For example, the image is corrected so as to detect an evening scenery and emphasize a hue according to scenes. Upon completion of the color brightness adjustment, the development processing is completed. A developer 918 for developing a plurality of images according to this embodiment includes the white balancer 905, the color interpolator 906, the matrix converter 907, the gamma converter 908, and the color luminance adjuster 909. The white balancer 905, the color interpolator 906, the matrix converter 907, the gamma converter 908, and the color luminance adjuster 909 are not characteristic of the present invention, and also mounted in a general digital camera.

Next, in the step S13 in FIG. 1, the controller 21 (image magnification corrector 910) corrects an image magnification on the developed image. Since the focus bracket imaging captures an image while moving the focus position (focus position), moving the focus lens unit in the imaging optical system fluctuates an angle of view or the imaging magnification. Hence, if a plurality of images acquired by the focus bracket imaging are directly combined, the images may shift and the quality of the combined all focused image may be degraded. The image magnification corrector 910 according to this embodiment corrects magnifications of a plurality of images captured at a plurality of different focus positions. More specifically, the image magnification corrector 910 performs image magnification correction processing that selects one image as a reference image from among a plurality of images, and corrects the imaging magnifications of the remaining plurality of images except for the reference image. For example, the image magnification corrector 910 calculates first conversion data (first conversion coefficient) so that the magnification of the reference image (reference magnification) and the magnification of the image excluding the reference image coincide with each other, and corrects the magnifications of images other than the reference image by using the data.

The image magnification correction data 904 used for the image magnification correction processing is previously stored, for example, in the internal memory (ROM) in the controller 21. For a data format of the image magnification correction data, for example, a finite number of grids are prepared in the image height direction, and a form of a one-dimensional lookup table (1 DLUT) of the pre-correction image height—the post-correction image height for each grid can be stored. Since 1 DLUT of the pre-correction image height—the post-correction image height changes according to the object distance and the paraxial magnification, the 1DLUT for each representative object distance and paraxial magnification is previously stored and the 1DLUT of the pre-correction image height—the post-correction image height corresponding to the object distance and the paraxial magnification in imaging may be calculated by the interpolation. The image magnification corrector 910 corrects an image magnification by using the 1DLUT of the pre-correction image height—the post-correction image height obtained by the above method.

Figure 5:
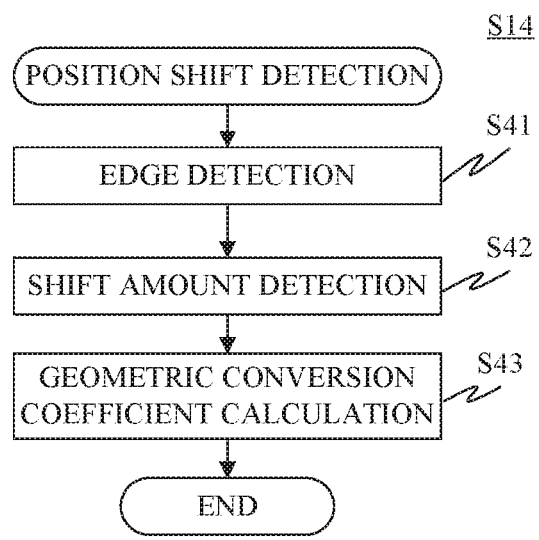
FIG. 5 is a flowchart of a position shift detection in alignment processing according to each embodiment.

Next, in the step S14, the aligner 911 aligns (or performs alignment processing for) the plurality of images corrected by the image magnification corrector 910 in order to correct the remaining correction in the image magnification correction processing and the position shift caused by the handheld imaging. Referring now to FIG. 5, a description will be given of the position shift detection in the alignment processing (step S14) according to this embodiment. FIG. 5 is a flowchart of the position shift detection.

Initially, in the step S41, the aligner 911 divides each developed image into a plurality of block areas, and performs edge detection processing for each block area. One edge detection method is to apply a low-pass filter to the input image, to create a large blurred image, and to subtract the large blurred image from the input image. Alternatively, a method using a known differential filter, a Prewitt filter or the like may be employed. The edge detection can improve the position shift detection accuracy by detecting only the edge of the object image, rather than the noise caused by the sensor.

Next, in the step S42, the aligner 911 detects a shift amount for the block area in which the edge is detected in the block area of the image. Detecting the shift amount only for the block area having the detected edge can improve the position shift detection accuracy. The shift amount detecting method contains as follows. First, the sum (SAD: Sum of Absolute Difference) of the absolute values of the difference is calculated between the pixel value (luminance) of the position reference image of all pixels in the block area and the pixel value (luminance) of the position shift detection image. Then, a movement amount and a movement direction that minimize the sum (SAD) are obtained, and the movement amount and the movement direction are determined as a motion vector in the block area.

Figures 6A, 6B:
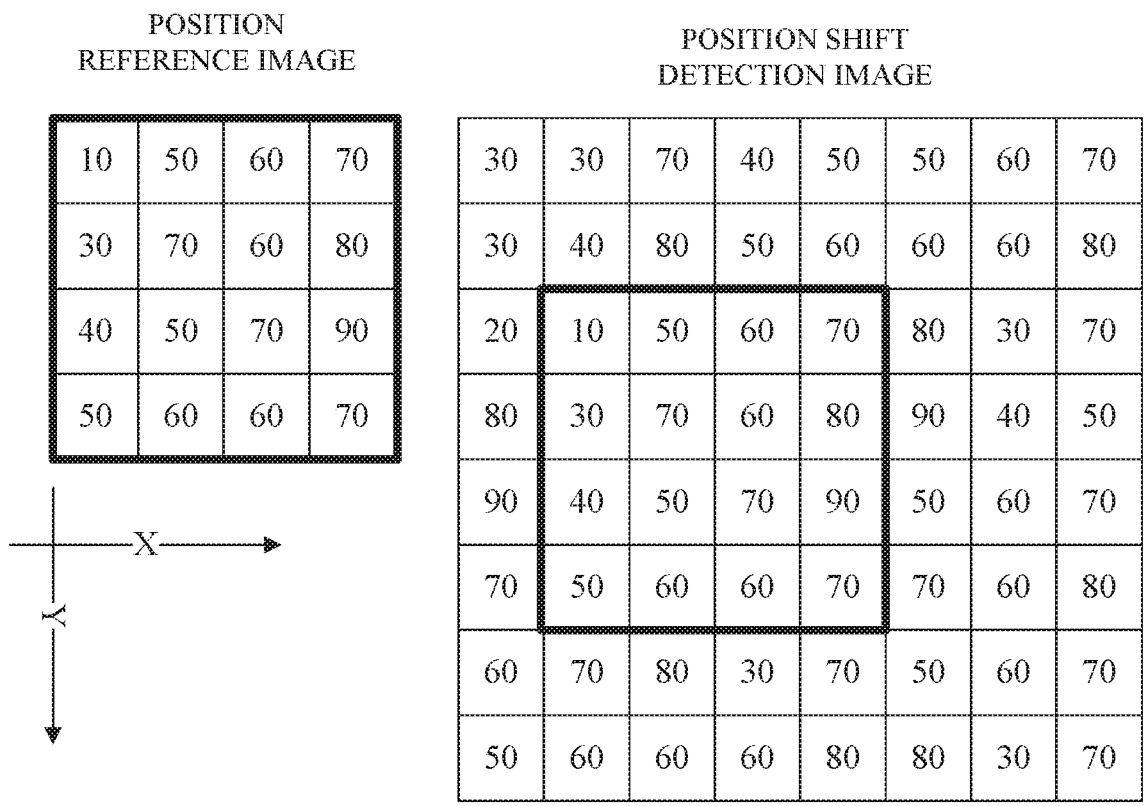
FIGS. 6A and 6B explains a position shift amount detection according to each embodiment.

This embodiment sets a first image as a position reference image. FIGS. 6A and 6B explain a position shift amount detecting method. FIG. 6A illustrates a pixel value in a target block area of the position reference image. FIG. 6B illustrates a pixel value in a position shift detection image. In FIGS. 6A and 6B, the movement amount that minimizes the absolute value as the difference between the pixel values is obtained as (x, y)=(1, 2). The same processing is performed for all block areas in the image, and a motion vector in all block areas are obtained. In detecting the shift amount, in order to improve the position shift detection accuracy, corresponding object areas in the position reference image and the position shift detection image may have the same brightness. Since this embodiment detects a position shift before correcting the longitudinal chromatic aberration, the G signal may be used instead of the luminance component (Y signal) in order to prevent the remaining longitudinal chromatic aberration from negatively influencing the accuracy of the position shift detection.

Finally, in the step S43 in FIG. 5, the aligner 911 calculates a geometric conversion coefficient (second conversion coefficient or second conversion data). This embodiment uses an affine coefficient as the geometric transformation coefficient. The affine coefficient is a matrix used for an affine transformation that combines the linear transformation and parallel movement (translation) with each other, and expressed by the following expression (2).

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad (2)$$

In the expression (2), (x, y) is a coordinate of the pre-correction image, (x', y') is a coordinate of the post-correction image, and a 3×3 matrix is called the affine coefficient. The aligner 911 obtains the affine coefficient by using the motion vector obtained from each block area.

The position shift detection method according to this embodiment is as described above. The position shift detection methods contain various other known methods, such as detecting a position shift amount between two images from the frequency analysis, and any methods may be used as long as it is suitable for the digital camera in the position shift detection accuracy, the detection processing load, and the detection processing speed. Thereafter, the aligner 911 corrects a position shift (performs the affine transformation) of the second and subsequent images based on the calculated affine coefficients. According to this embodiment, the aligner 911 calculates second conversion data (second conversion coefficient) so that the corresponding points coincide with each other between the reference image and the magnification-corrected image, and aligns the reference image and the magnification-corrected image with each other by using the second conversion data. The aligner 911 may calculate the second conversion data on the G channel.

Figure 7:
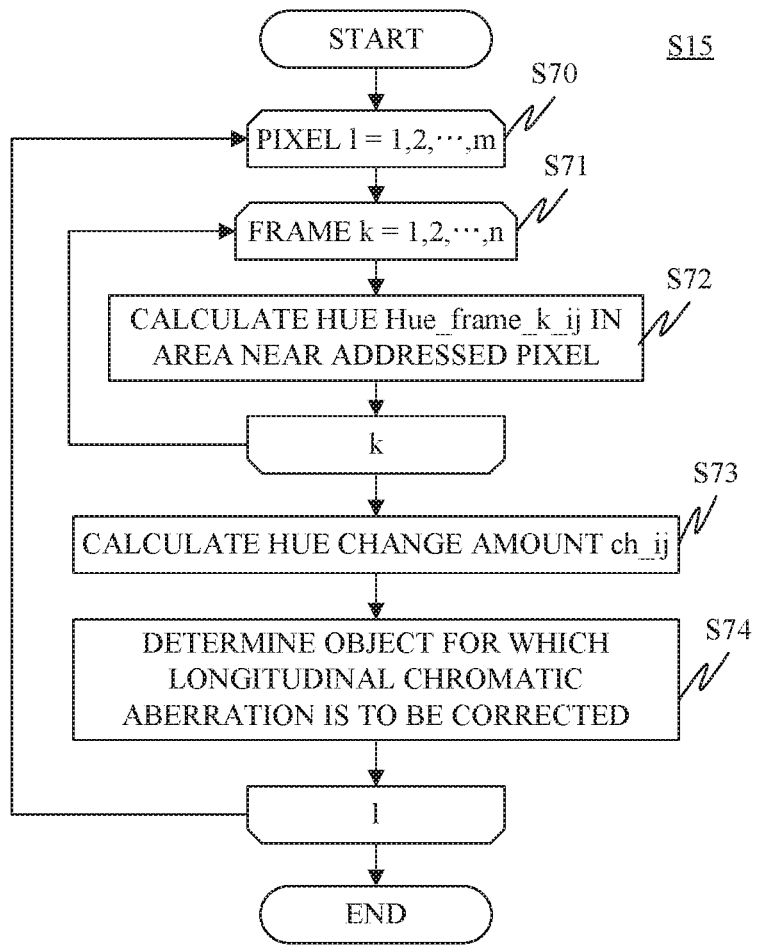
FIG. 7 is a flowchart of a method for generating a longitudinal chromatic aberration map according to each embodiment.

Next, in the step S15 in FIG. 1, the controller 21 (longitudinal chromatic aberration map generator 912) generates the longitudinal chromatic aberration map for each of the first image and the second and subsequent aligned images. In order to determine the likelihood of the longitudinal chromatic aberration of each pixel, a plurality of images (captured images) are used. Referring now to FIG. 7, a description will be given of a method of generating the longitudinal chromatic aberration map. FIG. 7 is a flowchart of a method of generating the longitudinal chromatic aberration map. The processing illustrated in FIG. 7 is repeated for all pixels (pixel l=1, 2, . . . , M: step S70) and all frames (frame k=1, 2, . . . , N: step S71). In other words, according to this embodiment, the color blur corrector corrects the longitudinal chromatic aberration for each pixel corresponding to each of the plurality of images.

Figures 8, 9A, 9B:
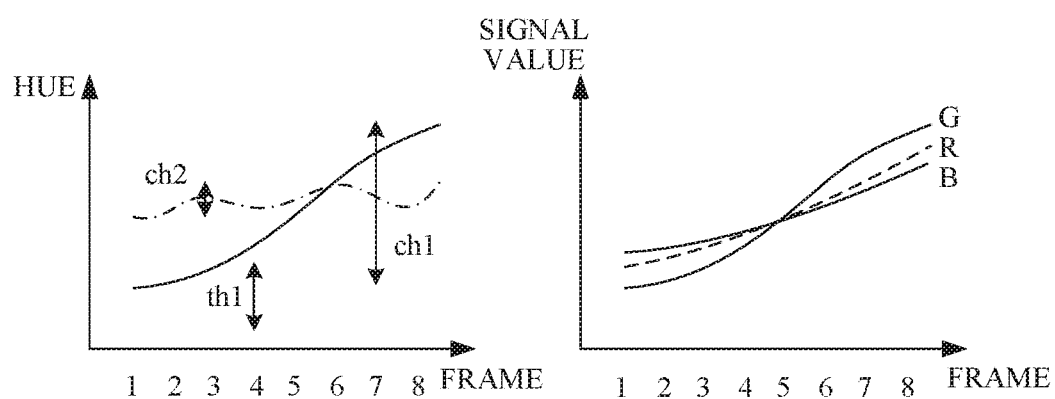
FIG. 8 illustrates an addressed pixel and pixels around it according to each embodiment.
FIGS. 9A and 9B illustrate a change of a hue and a change of a signal value of each channel in a focus position variation direction according to each embodiment.

In the step S72, the longitudinal chromatic aberration map generator 912 calculates hue HueframeK_ij of the area near the addressed pixel. FIG. 8 illustrates the addressed pixel and pixels around it. An area near the addressed pixel (i, j), for example, a 3×3 hue Hueframe K_ij illustrated in FIG. 8, is calculated as in the following expression (3).

$$Hue_{frameK\_ij} = \frac{\sum_{i,j=i-n,j-n}^{n} Hue_{i,j}}{N} \quad (3)$$

After calculating hues of all frames, the longitudinal chromatic aberration map generator 912 can calculate a hue change amount ch_ij at the addressed pixel (i, j) in the step S73. FIG. 9A illustrates a change in hue in the fluctuation direction of a focus position by a plurality of images at the addressed pixel (i, j). FIG. 9A illustrates two examples of a solid line and an alternate long and short dash line. In the solid line, the hue change amount ch1 is large over the frame. In the alternate long and short dash line, the hue change amount ch2 is small.

Figure 10:
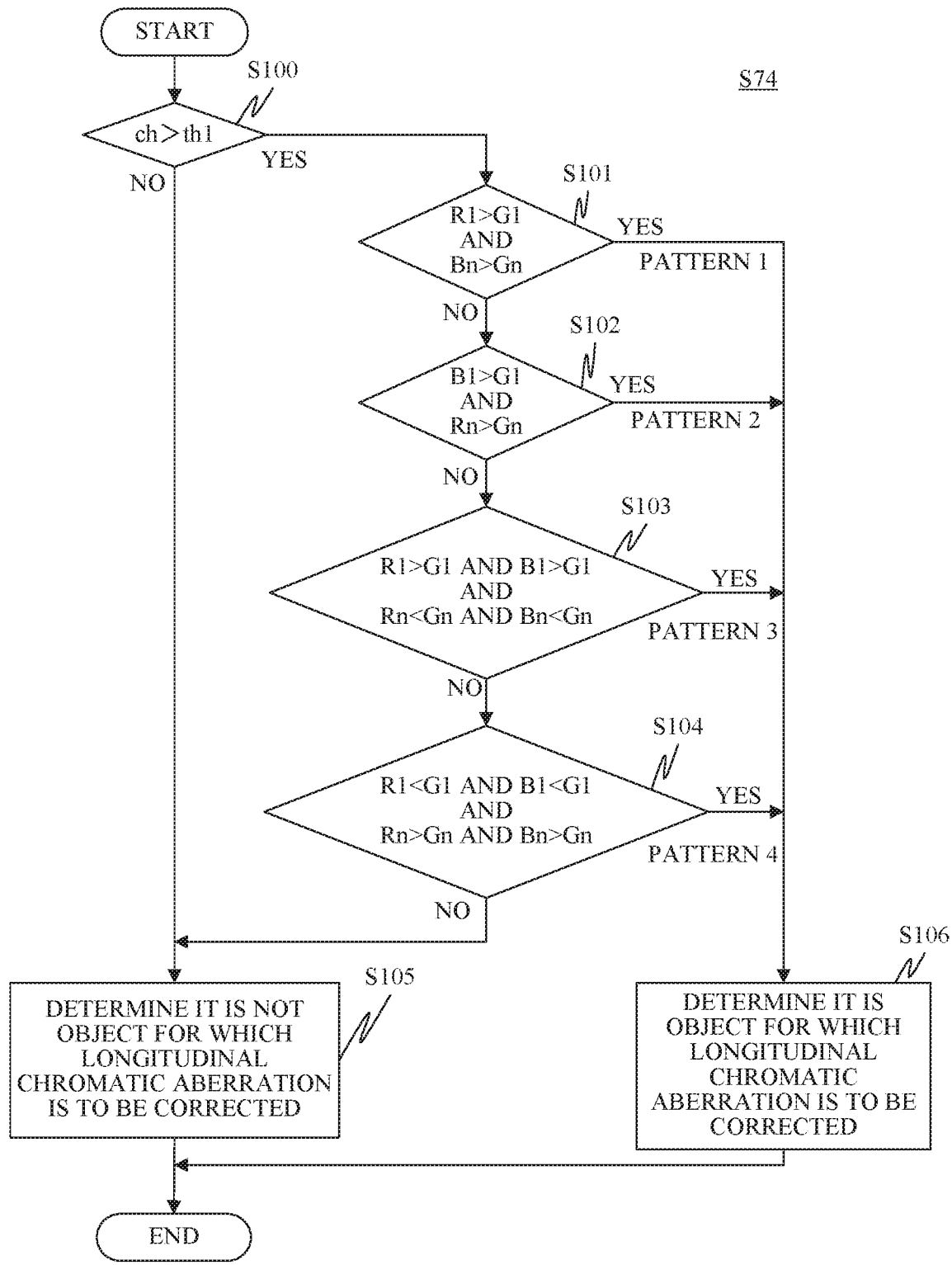
FIG. 10 is a flowchart of determination processing of a longitudinal chromatic aberration to be corrected according to a first embodiment.

Next, in the step S74 in FIG. 7, the longitudinal chromatic aberration map generator 912 determines whether or not the addressed pixel is an object for which the longitudinal chromatic aberration is to be corrected. Referring now to FIG. 10, a description will be given of processing for determining whether or not the addressed pixel is the object for which the longitudinal chromatic aberration is to be corrected. FIG. 10 is a flowchart showing the determination processing of the object for which the longitudinal chromatic aberration is to be corrected. In the step S100, the longitudinal chromatic aberration map generator 912 determines, when a hue change amount ch is smaller than the predetermined threshold th1, that coloring of the addressed pixel is not caused by the longitudinal chromatic aberration but caused by the original color of the object. When the longitudinal chromatic aberration map generator 912 determines that the coloring of the addressed pixel is caused by the original color of the object, the flow proceeds to the step S105, and the longitudinal chromatic aberration map generator 912 determines that this pixel is not an object for which the longitudinal chromatic aberration is to be corrected. On the other hand, when the hue change amount chk is larger than the predetermined threshold th1, the flow proceeds to the step S101.

FIG. 9B illustrates a signal value change of each channel in a focus position fluctuation direction by a plurality of images in the addressed pixel. In FIG. 9B, a thick solid line indicates a G channel, a dotted line indicates an R channel, and a thin solid line indicates a B channel. When the focus surface is set as frame 5, frames 1 to 4 are on the front side of the focus surface (first image), frame 5 is an image on the focus surface (third image), and frames 6 to 8 are images at the back of the focus surface (second image). The longitudinal chromatic aberration is determined based on whether the hue changes before and after the focus surface. FIG. 10 summarizes the above result.

Pattern 1: Red blur→blue blur (S101)
Pattern 2: Blue blur→red blur (S102)
Pattern 3: purple blur→green blur (S103)
Pattern 4: Green blur→Purple blur (S104)

In case of the above patterns, the flow proceeds to the step S106 in FIG. 10, and the longitudinal chromatic aberration map generator 912 determines that the coloring of the addressed pixel is caused by longitudinal chromatic aberration rather than the object color. On the other hand, where none of the above patterns 1 to 4 is not applied, the flow proceeds to the step S105, and the longitudinal chromatic aberration map generator 912 determines that the coloring of the addressed pixel is not caused by the longitudinal chromatic aberration. When the longitudinal chromatic aberration map generator 912 finishes determining the object for which the longitudinal chromatic aberration is to be corrected for all pixels, the generation of the longitudinal chromatic aberration map is completed. The longitudinal chromatic aberration map is binary data in which 1 is set if it is an object to be corrected in each pixel and 0 is set if it is not an object to be corrected.

Figure 11:
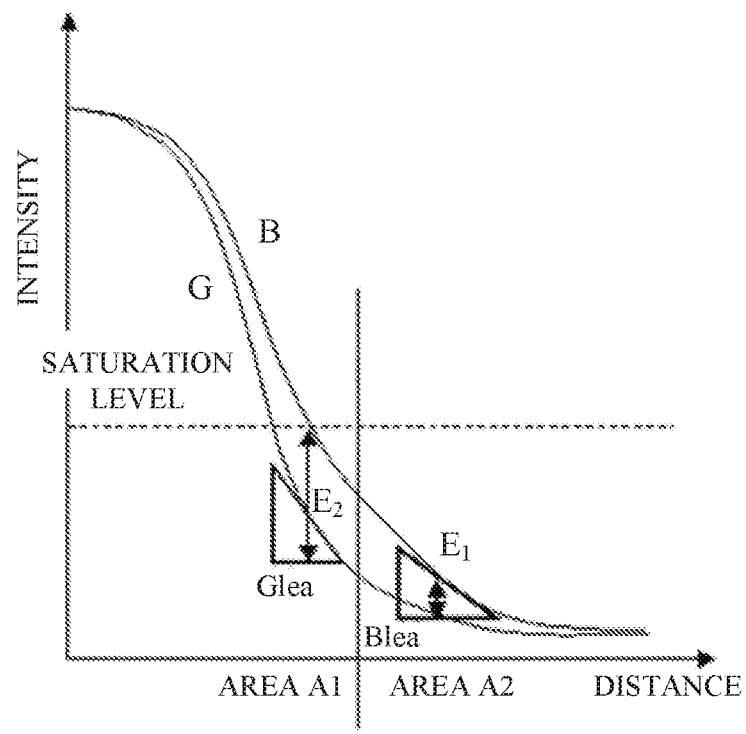
FIG. 11 illustrates a typical intensity change of a blue blur according to each embodiment.

Next, in the step S16 in FIG. 1, the controller 21 (longitudinal chromatic aberration corrector 913) corrects the longitudinal chromatic aberration by using the longitudinal chromatic aberration map generated in the step S15. FIG. 11 illustrates a typical intensity change of a blue blur. In FIG. 11, the abscissa axis represents the section (distance) on the image, and the ordinate axis represents the intensities of the B plane and the G plane. FIG. 11 assumes a high luminance object exceeding the saturation luminance at the left end. In the originally non-bright periphery of the light source, the margin of the intensity change exponentially spreads due to the light blurred from the light source caused by the aberration and flare. While the G plane may contain a blur and a spread to some extent, they are smaller than those of the B plane. The image sensor 10 cannot measure the intensity above the predetermined saturation level. In this intensity change, when the intensity of B exceeds the intensity of G, the blue blur occurs.

This embodiment estimates a blur amount of B based on a slope of the intensity change of B. Accordingly, an absolute value of the slope Blea of B is multiplied by the coefficient k1 to obtain the first estimated blur amount E1:

$$E1 = k1|R1ea|$$

where k1 is a positive value. However, the luminance slope becomes 0 in the area A1 where B is saturated, and the pre-saturation luminance slope cannot be obtained. Thus, the estimated blur amount E2 for this area is estimated based on the slope Glea of the intensity change of G:

$$E2 = k2|Glea|$$

where k2 is a positive value.

Figure 12:
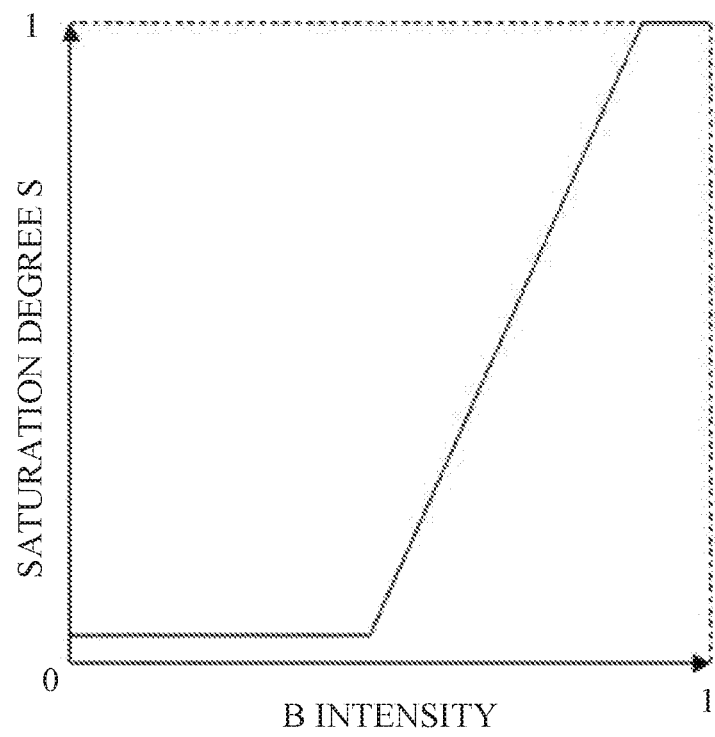
FIG. 12 illustrates a nonlinear conversion characteristic according to each embodiment.

Next, the intensity of the B plane is nonlinearly converted into the saturation degree S. This nonlinear transformation indicates whether or not B is saturated, and becomes 1 in the area where the intensity of B is saturated and 0 in the area where the intensity of B is small. Although the saturation degree S may be binary or 0 or 1, it may be a value continuously changing from 0 to 1 as illustrated in FIG. 12 about the nonlinear conversion characteristic. Then, the estimated blur amount E1 or E2 calculated according to the saturation degree S is selected. In other words, if the saturation degree S is binary or 0 or 1, a newly estimated amount E is set as follows.

$$E = E1 \text{ (where } S=0)$$

$$E = E2 \text{ (where } S=1)$$

If the saturation degree S is a value continuously changing from 0 to 1, the newly estimated amount E is set as follows:

$$E = (1-S)E1 + SE2$$

Then, as described below, a removal amount E is subtracted from the intensity of the B plane so as to create a new B plane.

$$B = B - E$$

Only pixels having a value of "1" in the longitudinal chromatic aberration map are set to the object to be removed. The longitudinal chromatic aberration corrector 913 outputs the image having the corrected B plane to the image combiner 914 as described above. This implementation describes the blue blur, but in case of the red blur, the B plane in FIG. 11 may be replaced with the R plane. In case of the purple blur, both the blue blur and the red blur may be corrected. In case of the green blur, the B plane in FIG. 11 may be replaced with G and the G plane may be replaced with the average of R and B.

In this embodiment, the longitudinal chromatic aberration map generator 912 and the longitudinal chromatic aberration corrector 913 serves as a color blur corrector configured to correct the color blur or the longitudinal chromatic aberration in a plurality of images aligned by the aligner 911.

Thus, the color blur corrector according to this embodiment corrects the color blur when a difference (hue change amount ch) between the first hue in the first image and the second hue in the second image among the plurality of aligned images is larger than a predetermined threshold th1 (S100). Assume that the first hue is the minimum hue among the plurality of images, and the second hue is the maximum hue among the plurality of images. Alternatively, the first hue may be set to the hue of the first captured image (k=1), and the second hue may be set to the hue of the last captured image (k=n).

When the first hue of the first image and the second hue of the second image among the plurality of aligned images are inverted to each other, the color blur corrector corrects the color blur (S101 to S104). Assume that the first image is the first captured image (k=1) among the plurality of images and the second image is the last captured image (k=n) among the plurality of images. Of course, the present invention is not limited to this example as long as the effect of this embodiment is available. The hue inversion may be determined for three consecutive frame images (n=k−1, k, k+1).

Next, in the step S17 in FIG. 1, the controller 21 (image combiner 914) selects the pixel value of the image with the highest sharpness or the best focused image among the plurality of images, and combines the images. The image combiner 914 combines the plurality of images corrected by the color blur corrector. The image combined by the image combiner 914 is stored in a recorder 916 (corresponding to the memory 26, the memory 28, or the RAM in the controller 21) via a compressor 915. Thereby, a highly sharp image at any positions in the image or the all focused image 917 can be obtained as a final image.

This embodiment can effectively correct the longitudinal chromatic aberration in acquiring the all focused image by highly accurately distinguishing the coloring caused by the longitudinal chromatic aberration from the coloring caused by the object color.

Second Embodiment

Figure 13:
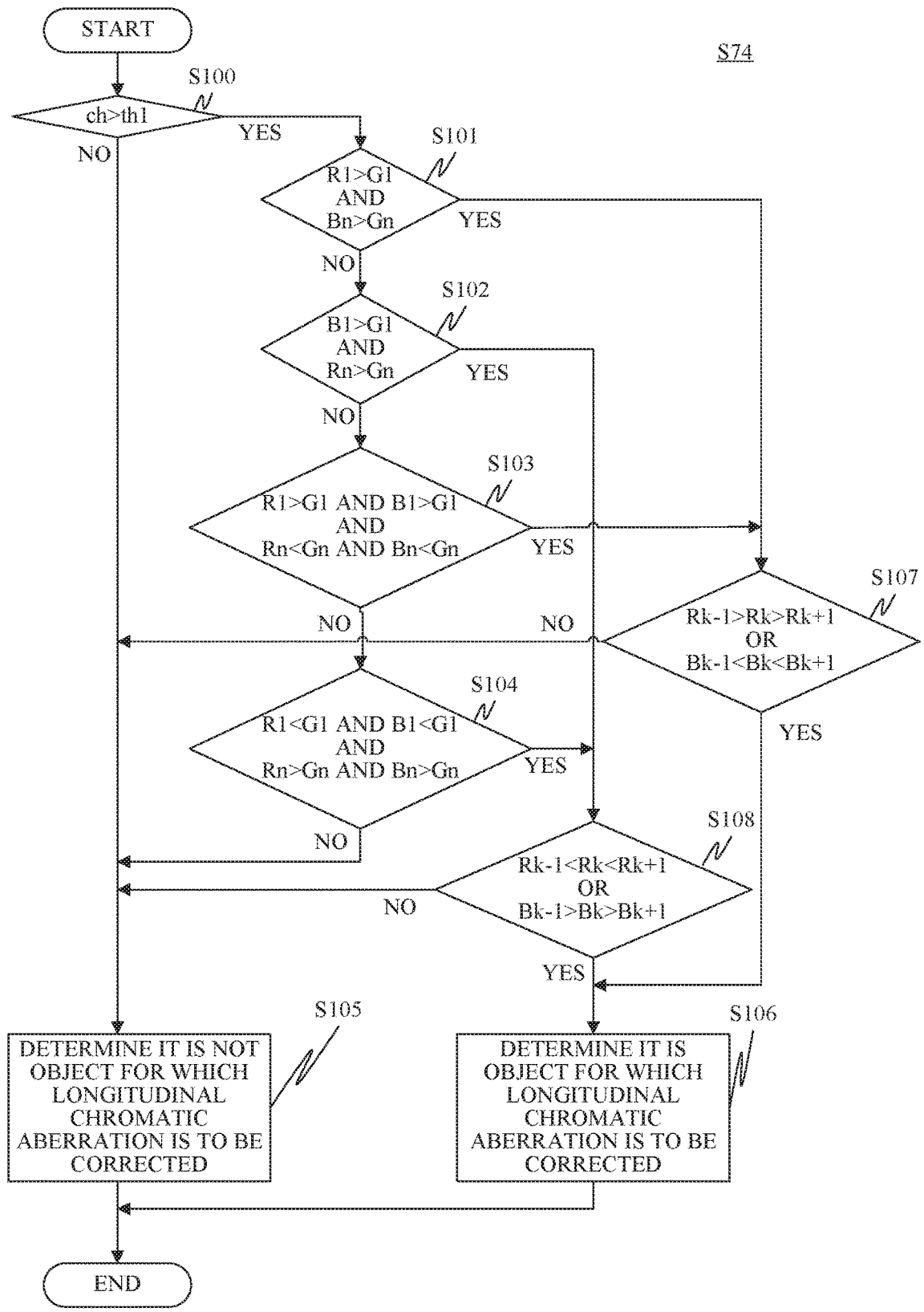
FIG. 13 is a flowchart of determination processing of a longitudinal chromatic aberration to be corrected according to a second embodiment.

Referring now to FIG. 13, a description will be given of a second embodiment according to the present invention. The first embodiment determines the longitudinal chromatic aberration on the assumption that the hue is reversed before and after the focus surface. On the other hand, this embodiment is different from the first embodiment in determining the longitudinal chromatic aberration based on the monotonic change of the hue in the course of the front side of the focus surface, the focus surface, and the backside of the focus surface.

FIG. 13 is a flowchart of the determination processing of the object for which the longitudinal chromatic aberration is to be corrected. FIG. 13 adds determining a monotonic increase or a monotonic decrease (steps S107, S108) to FIG. 10. When it is determined in the step S101 or the step S103 that the hue of the longitudinal chromatic aberration correction is reversed, the flow proceeds to the step S107. In the step S107, the controller 21 (longitudinal chromatic aberration map generator 912) determines whether one frame before the addressed frame k, the addressed frame k, and one frame after the addressed frame k have a monotonically decreasing relationship (Rk−1>Rk>Rk+1) or a monotonically increasing relationship (Bk−1<Bk<Bk+1). In case of the monotonically decreasing relationship or monotonically increasing relationship, the controller 21 determines that the addressed pixel is the object for which the longitudinal chromatic aberration is to be corrected.

Similarly, if it is determined in the step S102 or the step S104 that the hue of longitudinal chromatic aberration correction is reversed, the flow proceeds to the step S108. In the step S108, the controller 21 determines whether one frame before the addressed frame k, the addressed frame k, and one frame after the addressed frame k have a monotonically decreasing relationship (Bk−1>Bk>Bk+1) or a monotonically increasing relationship (Rk−1<Rk<Rk+1). In case of the monotonically decreasing relationship or monotonically increasing relationship, the controller 21 determines that the addressed pixel is the object for which the longitudinal chromatic aberration is to be corrected. Adding the determination condition of the monotonic increase or decrease can eliminate irregular changes such as when the object moves during capturing, and more accurately determine the longitudinal chromatic aberration.

Figure 14:
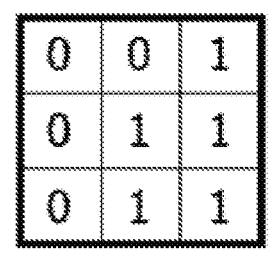

FIG. 14 illustrates a 3×3 pixel area in the longitudinal chromatic aberration map plane. Assume that the longitudinal chromatic aberration determination is switched in the adjacent pixels, as illustrated in FIG. 14, in the 3>3 pixel area in the longitudinal chromatic aberration map. Then, a longitudinal chromatic aberration correction amount may fluctuate at the boundary, the intensity steeply and unnaturally may change, and the observer may feel uncomfortable. Then, a low-pass filter LPF may be applied to the generated longitudinal chromatic aberration map (correction amount map).

As described above, the color blur corrector according to this embodiment corrects the color blur (longitudinal chromatic aberration) when the change from the first hue of the first image to the second hue of the second image among the plurality of images monotonically increases or decreases. This embodiment determines whether the hue monotonically increases or monotonically decreases, by using three consecutive frame images (n=k−1, k, k+1) but the present invention is not limited as long as the effect of the present invention is available. This embodiment can reduce the problem of the longitudinal chromatic aberration correction as compared with the first embodiment.

Third Embodiment

Figure 15:
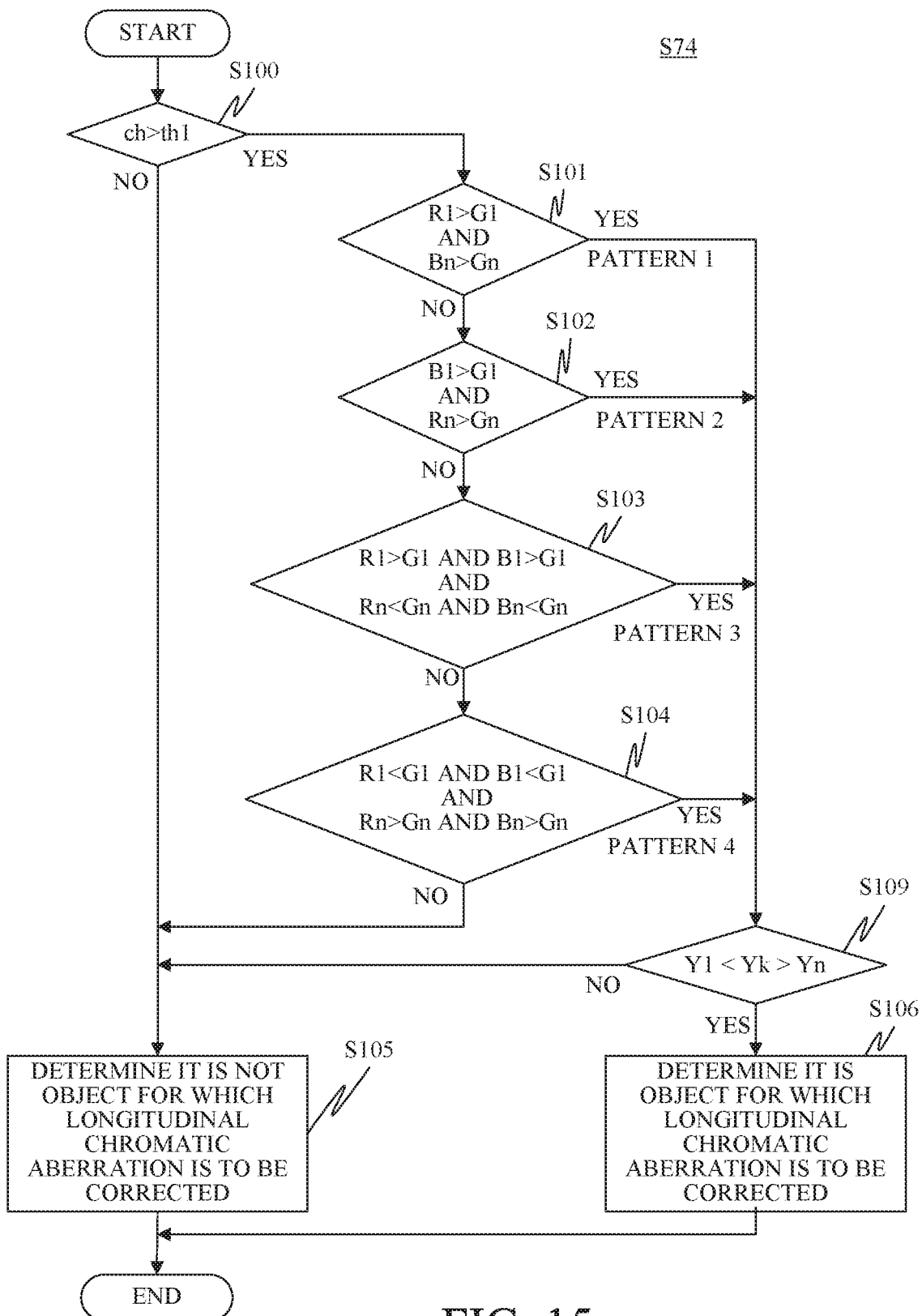
FIG. 15 is a flowchart of determination processing of a longitudinal chromatic aberration to be corrected according to a third embodiment.

Referring now to FIG. 15, a description will be given of a third embodiment according to the present invention. The first embodiment determines the longitudinal chromatic aberration based on the reversal of the hue before and after the focus surface. On the other hand, this embodiment is different from the first embodiment in determining the longitudinal chromatic aberration further based on the luminance change characteristic in the course of the front side of the focus surface, the focus surface, and the backside of the focus surface.

FIG. 15 is a flowchart of the determination processing of the object for which the longitudinal chromatic aberration is to be corrected. FIG. 15 adds determining the luminance change characteristic (step S109) to FIG. 10. Since the longitudinal chromatic aberration has a high frequency characteristic, the signal intensity of the longitudinal chromatic aberration on the focus surface is higher than that on the non-focus surface. On the other hand, the signal intensity does not significantly change between the focus surface and the non-focus surface for a particularly low frequency colored object. Thus, this embodiment adds the luminance change characteristic to the determination condition. More specifically, this embodiment determines the object for which the longitudinal chromatic aberration is to be corrected when the luminance Y representing the signal intensity satisfies the convex upward characteristic (Y1<Yk>Yn).

Thus, the color blur corrector according to this embodiment compares a third luminance (Yk) of a third image (1<k<n) captured between a first image (k=1) and a second image (k=n) with a first luminance (Y1) of the first image and a second luminance (Yn) of the second image. When the third luminance is higher than each of the first luminance and the second luminance, the color blur corrector corrects the color blur. In this embodiment, the first image is the first captured image (k=1) and the second image is the last captured image (k=n), but as long as the effect of this embodiment is available, the present invention is not limited to this example. For example, the object for which the longitudinal chromatic aberration is to be corrected may be determined only when luminances of three consecutive frame images (n=k−1, k, k+1) satisfy Yk−1<Yk>Yk+1. Therefore, this embodiment can more accurately determine the longitudinal chromatic aberration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention discusses has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-212316, filed on Nov. 2, 2017, which is hereby incorporated by reference herein in its entirety.

What is claimed is:

1. An image processing method comprising:
correcting a magnification in a plurality of images captured at a plurality of different focus positions;
aligning the plurality of images having the corrected magnification;
calculating a change in hues and/or a change in luminances among the plurality of aligned images;
correcting a color blur caused by chromatic aberration of an imaging optical system in the plurality of aligned images based on the calculating result; and
combining the plurality of images having the corrected color blur,
wherein the magnification is corrected by using first correction data stored in a memory, the first correction data being calculated so that a reference magnification of a reference image selected among the plurality of images coincides with the magnification of an image other than the reference image.

2. The image processing method according to claim 1, wherein the color blur is corrected when a difference is larger than a predetermined threshold between a first hue of a first image and a second hue of a second image among the plurality of aligned images.

3. The image processing method according to claim 1, wherein the color blur is corrected when a first hue of a first image and a second hue of a second image among the plurality of aligned images are reversed to each other.

4. The image processing method according to claim 1, wherein the color blur is corrected when a change from a first hue of a first image to a second hue of a second image among the plurality of aligned images monotonically increases or decreases.

5. The image processing method according to claim 1, wherein the color blur is corrected when a third image captured between a first image and a second image among the plurality of aligned images has a third luminance higher than each of a first luminance of the first image and a second luminance of the second image.

6. The image processing method according to claim 2, wherein the first image is a first captured image among the plurality of images and the second image is a last captured image among the plurality of images.

7. The image processing method according to claim 5, wherein the first image, the third image, and the second image are three consecutive images among the plurality of images.

8. The image processing method according to claim 5, further comprising developing the plurality of images captured at the plurality of different focus positions, wherein the magnification is corrected in the plurality of developed images.

9. The image processing method according to claim 1, wherein the plurality of images are aligned by using second conversion data calculated so that corresponding points of a reference image selected from among the plurality of images and the image having the corrected magnification coincide with each other.

10. The image processing method according to claim 9, wherein the second conversion data is calculated from a G channel.

11. The image processing method according to claim 1, wherein the color blur is corrected for each corresponding pixel in the plurality of images.

12. The image processing method according to claim 1, wherein the first correction data indicates a difference between a pre-correction image height and a post-correction image height in a finite number of grids arranged in an image height direction.

13. An image processing apparatus comprising:
a processor; and
a memory including instructions that, when executed by the processor, cause the processor to:
correcting a magnification in a plurality of images captured at a plurality of different focus positions;
aligning the plurality of images having the corrected magnification;
calculating a change in hues and/or a change in luminances among the plurality of aligned images;
correcting a color blur caused by chromatic aberration of an imaging optical system in the plurality of aligned images based on the calculating result; and
combining the plurality of images having the corrected color blur,
wherein the magnification is corrected by using first correction data stored in a memory, the first correction data being calculated so that a reference magnification of a reference image selected among the plurality of images coincides with the magnification of an image other than the reference image.

14. The image processing apparatus according to claim 13, wherein the first correction data indicates a difference between a pre-correction image height and a post-correction image height in a finite number of grids arranged in an image height direction.

15. An imaging apparatus comprising:
an image sensor;
a processor; and
a memory including instructions that, when executed by the processor, cause the processor to:
correcting a magnification in a plurality of images captured at a plurality of different focus positions;
aligning the plurality of images having the corrected magnification;
calculating a change in hues and/or a change in luminances among the plurality of aligned images;
correcting a color blur caused by chromatic aberration of an imaging optical system in the plurality of aligned images based on the calculating result; and
combining the plurality of images having the corrected color blur,
wherein the magnification is corrected by using first correction data stored in a memory, the first correction data being calculated so that a reference magnification of a reference image selected among the plurality of images coincides with the magnification of an image other than the reference image.

16. The imaging apparatus according to claim 15, wherein the processor discretely shifts the focus position by a predetermined moving amount.

17. The imaging apparatus according to claim 15, wherein the first correction data indicates a difference between a pre-correction image height and a post-correction image height in a finite number of grids arranged in an image height direction.

18. A non-transitory non-volatile storage medium storing a program that enables a computer to:
correcting a magnification in a plurality of images captured at a plurality of different focus positions;
aligning the plurality of images having the corrected magnification;
calculating a change in hues and/or a change in luminances among the plurality of aligned images;
correcting a color blur caused by chromatic aberration of an imaging optical system in the plurality of aligned images based on the calculating result; and
combining the plurality of images having the corrected color blur,
wherein the magnification is corrected by using first correction data stored in a memory, the first correction data being calculated so that a reference magnification of a reference image selected among the plurality of images coincides with the magnification of an image other than the reference image.

* * * * *